H. T. RICE.
COLLAPSIBLE SHAFT.
APPLICATION FILED NOV. 29, 1919.
1,392,798.
Patented Oct. 4, 1921.
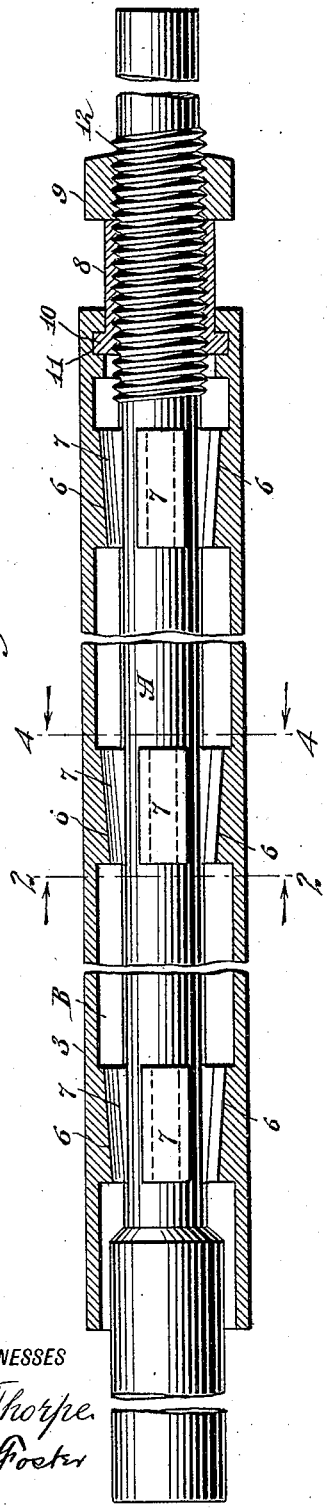
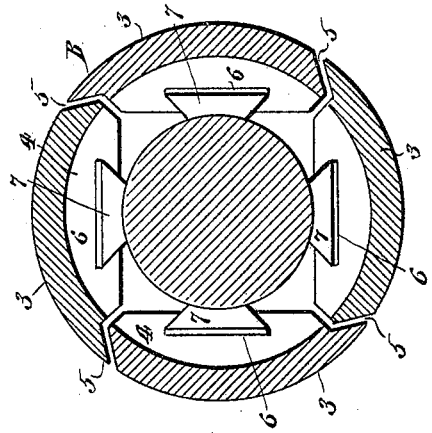
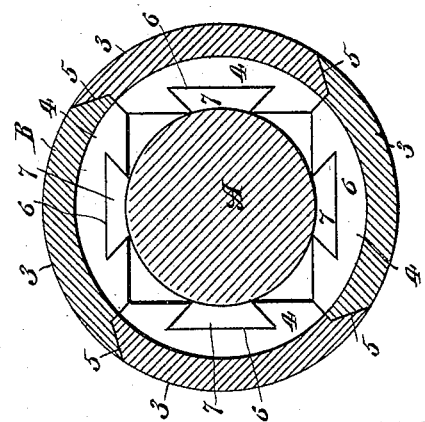
WITNESSES
INVENTOR
Harvey Terry Rice
BY
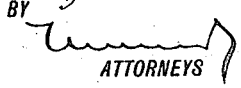
ATTORNEYS

UNITED STATES PATENT OFFICE.

HARVEY TERRY RICE, OF NORFOLK, NEW YORK.

COLLAPSIBLE SHAFT.

1,392,798. Specification of Letters Patent. Patented Oct. 4, 1921.

Application filed November 29, 1919. Serial No. 341,539.

*To all whom it may concern:*

Be it known that I, HARVEY TERRY RICE, a citizen of the United States, and a resident of the city of Norfolk, in the county of St. Lawrence, State of New York, have invented a new and Improved Collapsible Shaft, of which the following is a full, clear, and exact description.

This invention relates to improvements in collapsible shafts, an object of the invention being to provide a shaft which is capable of expansion and contraction and the means employed for adjusting the diameter is positive in its action in both expanding and contracting the shaft.

A further object is to provide an expansible shaft which dispenses with the necessity for springs and like devices, and which is of extremely simple construction, strong and durable in use.

With these and other objects in view, the invention consists in certain novel features of construction and combinations and arrangements of parts as will be more fully hereinafter described and pointed out in the claim.

In the accompanying drawings:

Figure 1 is a view partly in longitudinal section and partly in elevation, illustrating my improvements.

Fig. 2 is an enlarged view in section on the line 2—2 of Fig. 1.

Fig. 3 is a view similar to Fig. 2, showing the shell expanded.

Fig. 4 is a view in section on the line 4—4 of Fig. 1.

A represents a cylindrical core, which may constitute a solid rod and is screwthreaded adjacent one end, as shown at 2.

B represents the shell which is located around the core A and is preferably of four segments 3, each segment having any desired number of internal enlargements 4. I have illustrated three of these enlargements in each segment, but it is obvious that the number is not important.

The adjacent edges of the segments are preferably made angular as shown at 5, but I do not limit myself in this particular.

The enlargements in each segment 3 have longitudinal groove 6 which are dovetailed in cross section and taper longitudinally as shown most clearly in Fig. 1.

The core A is provided with fixed tenons 7 fitting the grooves 6, said tenons being dovetailed in cross section and tapering longitudinally. The taper of the tenons is opposite to the taper of the recesses, so that when the shell is moved longitudinally relative to the core the segments will be moved inwardly or outwardly as the case may be.

An operating sleeve 8 is internally screwthreaded and engages the threads 2. This sleeve 8 may be made angular on its exterior to facilitate the turning thereof or may be turned in any manner desired.

A nut 9 is located on the threaded portion 2 and may be moved to the right in Fig. 1 to limit the movement of the sleeve 8 in a direction to expand the shaft, so the shaft will be uniformly expanded at each operation.

This is important as one use for the shaft is to wind rolls of paper thereon and it insures uniform rolls with uniform bores therein.

An annular flange 10 on the sleeve 8 is positioned in grooves 11 in the segments 3, so that the segments are moved longitudinally by the shaft.

The operation is as follows:

When the sleeve 8 is turned on the core A it will move the segments 3 longitudinally and due to the inclined faces of the tenons 7 and grooves 6 the segments 4 will be moved radially either to expand or contract the shell B, and due to the dovetailed juncture of the parts the action will be positive in both directions.

Various slight changes might be made in the general form of the parts described without departing from my invention, and hence I do not limit myself to the precise details set forth, but consider myself at liberty to make such slight changes and alterations as fairly fall within the spirit and scope of the appended claim.

I claim:

A collapsible shaft, comprising a core having a screw threaded portion, an adjusting sleeve having internal screw threads engaging the threads of the core, a segmental shell around the core, each segment of the shell having an internal groove, an annular flange on the sleeve located in the grooves of the core segments, and a plurality of circular series of tenons fixed to the core, said shell segments having mortices receiving the tenons, said tenons and mortices being dove-tailed and having longitudinally inclined contacting faces, whereby when the sleeve is adjusted longitudinally of the core, the shell segments will be moved toward or away from the core.

HARVEY TERRY RICE.